Figure 1:
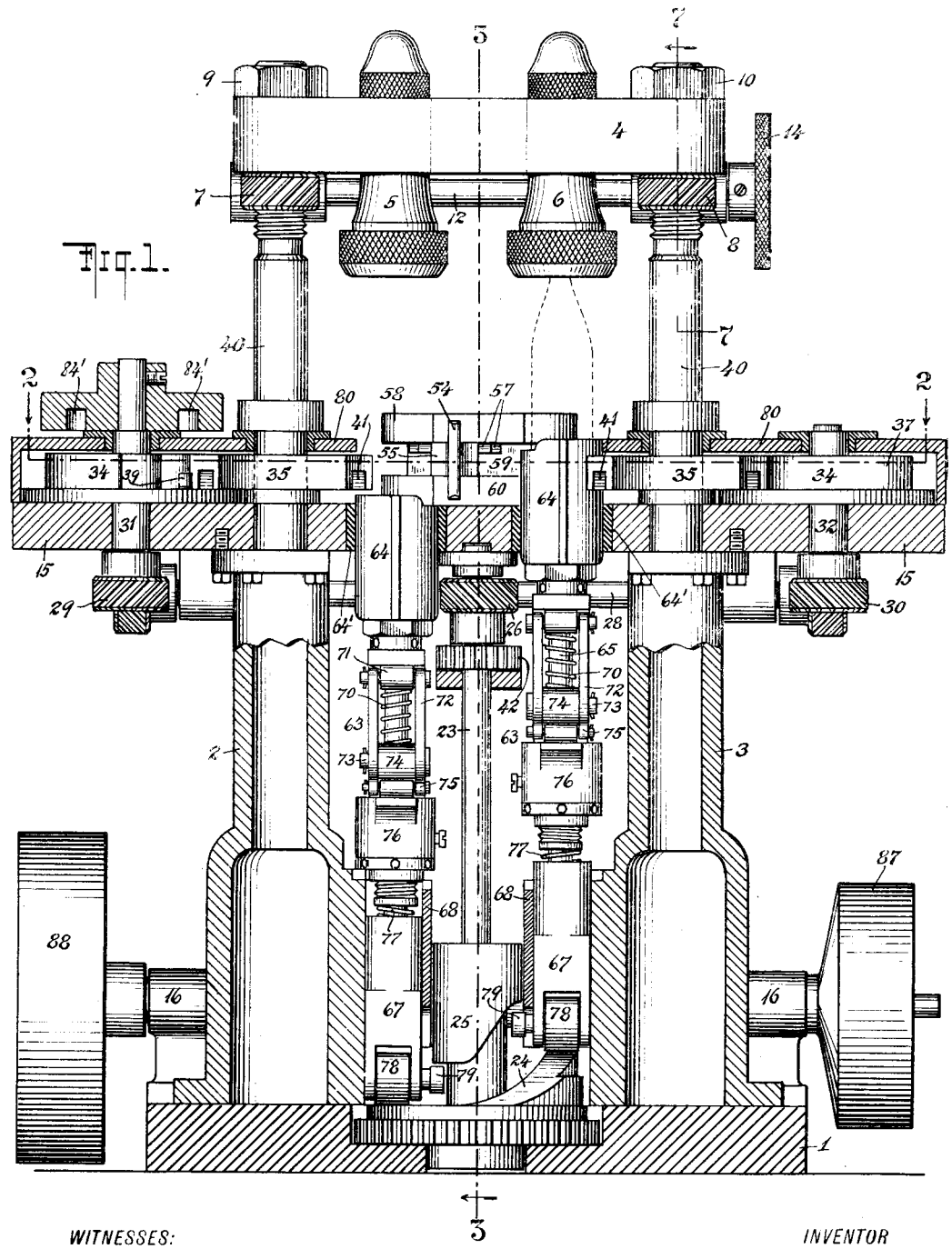

H. G. KLETT.
MACHINE FOR FEEDING AND CAPPING BOTTLES.
APPLICATION FILED JULY 5, 1910.

1,033,597.

Patented July 23, 1912.
4 SHEETS—SHEET 1.

WITNESSES:
G. V. Rasmussen
Geo. T. Stogg

INVENTOR
HENRY G. KLETT,
BY
Bielen & Knauth
ATTORNEYS

H. G. KLETT.
MACHINE FOR FEEDING AND CAPPING BOTTLES.
APPLICATION FILED JULY 5, 1910.
1,033,597.
Patented July 23, 1912.
4 SHEETS—SHEET 2.
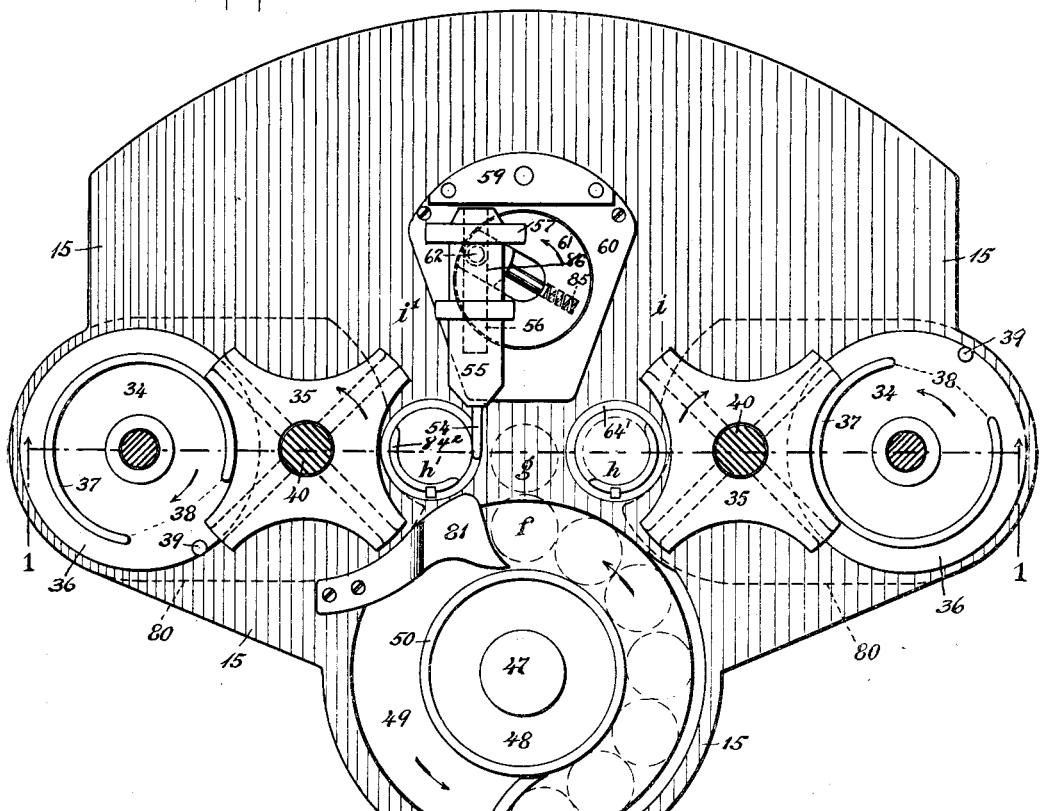
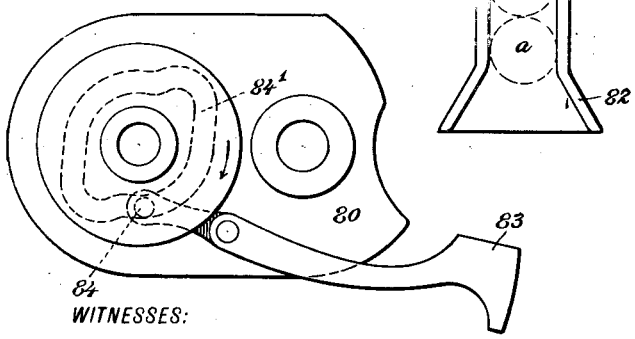
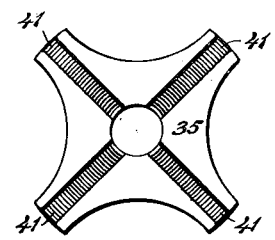
WITNESSES:
G. V. Rasmussen
Geo. T. Hogg
INVENTOR
HENRY G. KLETT,
BY
Nielsen Knauth
ATTORNEYS

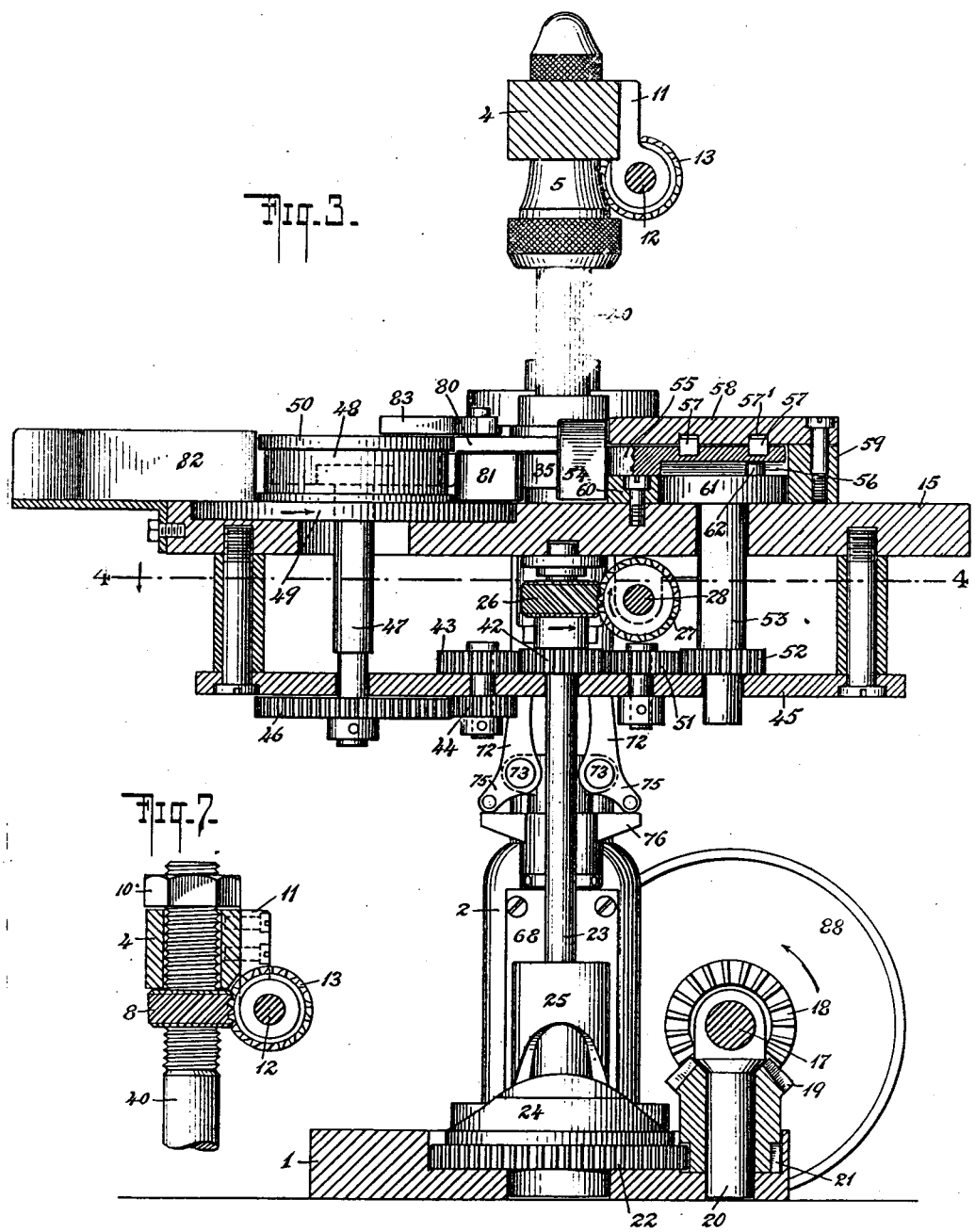

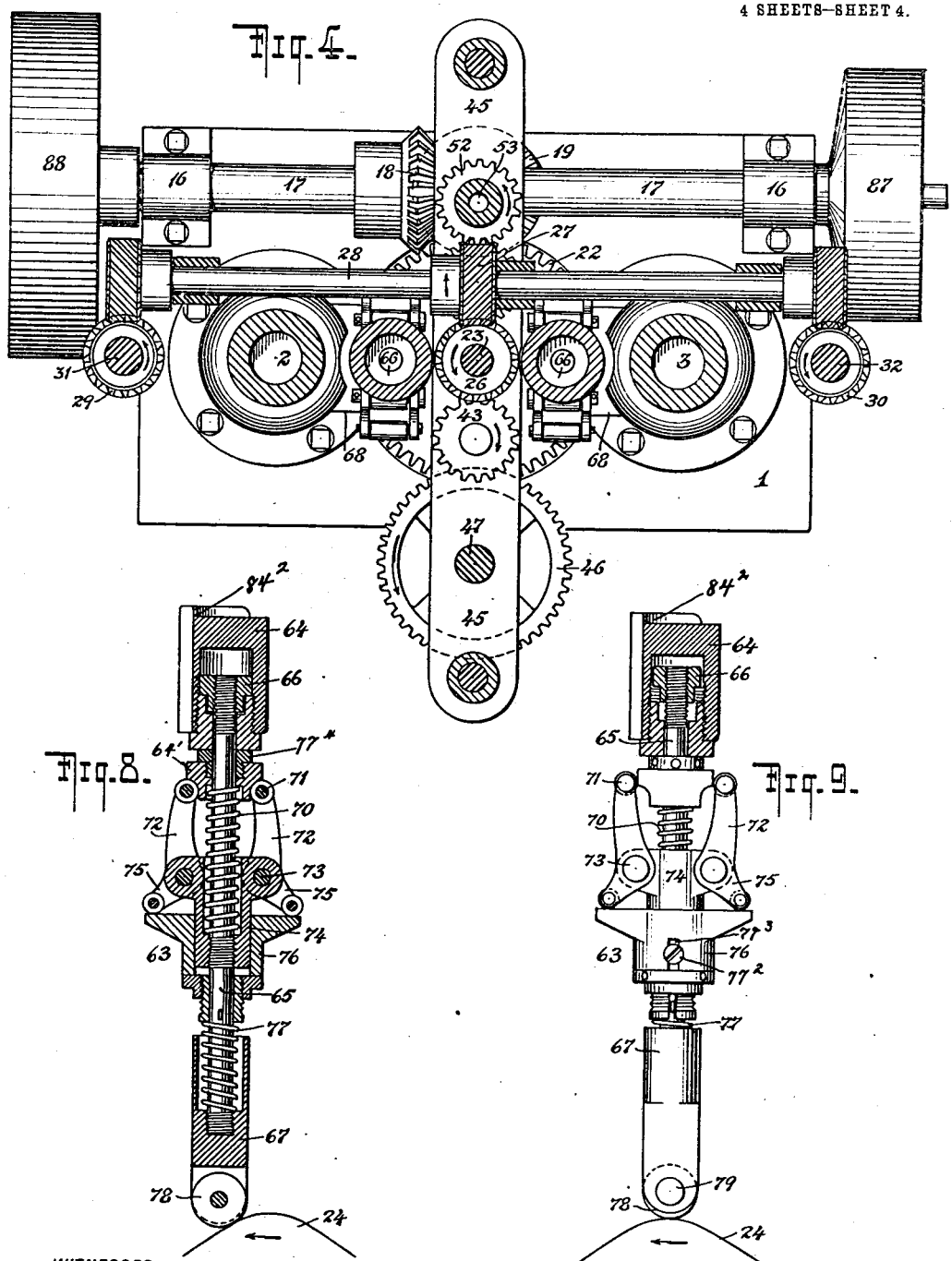

UNITED STATES PATENT OFFICE.

HENRY GODFRIED KLETT, OF NEW YORK, N. Y., ASSIGNOR TO THEODORE HAEBLER AND JOSE TORRES, TRUSTEES, OF NEW YORK, N. Y.

MACHINE FOR FEEDING AND CAPPING BOTTLES.

1,033,597.  Specification of Letters Patent.  Patented July 23, 1912.

Application filed July 5, 1910. Serial No. 570,265.

*To all whom it may concern:*

Be it known that I, HENRY GODFRIED KLETT, a subject of the German Emperor, and resident of the borough of Manhattan, city, county, and State of New York, have invented certain new and useful Improvements in Machines for Feeding and Capping Bottles, of which the following is a specification.

My invention relates to a machine for feeding and capping bottles and has for its object to provide a machine by means of which bottles may be quickly, safely and certainly fed and capped.

A further object of my invention is to provide a machine which is not affected by reasonable variations in the size of the bottles, either as to their diameter or height, which may be fed to the machine.

A further object of my invention is to provide a machine in which the bottles are alternately fed to two similar capping mechanisms each of which operates at a speed as great as could be utilized were the bottles fed in one series to but one capping mechanism, thus providing a duplex feeding and capping machine.

A still further object of my invention is the embodiment therein of a special form of compensating device for variations in length of bottles of a given class, the special advantages of which will be later brought out.

Still further objects of my invention reside in specific adaptations of mechanical elements whereby the various functions of the machine are performed with certainty, while at the same time said related parts are combined in a convenient and compact manner.

In the accompanying drawings, which are hereby made a part of the specification, Figure 1 is a vertical section passing through the central plane of the two main supports of the machine along the line 1—1 of Fig. 2, certain parts of the view being in elevation; Fig. 2 is a plan view from above, taken along the line 2—2 of Fig. 1; Fig. 3 is a vertical section, part elevation, looking from the right and taken along the line 3—3 of Fig. 1; Fig. 4 is a horizontal section, looking from above, along the line 4—4 of Fig. 3; Fig. 5 is a plan view, taken from above, showing the operation of the secondary feeding finger; Fig. 6 is a plan view, looking from below, of one of the star wheels used to sweep the capped bottles from its plunger; Fig. 7 is a vertical section along the line 7—7 of Fig. 1 showing the means by which the capping heads are raised or lowered when the height of bottles to be capped is to be changed; Fig. 8 is a central vertical section of one of the capping plungers; and Fig. 9 is an elevation, taken from the same direction, of said plunger.

In the drawings a base 1 supports two symmetrically arranged identical pillars 2, 3, across the top of which is held a yoke 4 carrying the two similar capping heads 5, 6. The upper ends of the two pillars 2, 3 are screw threaded for some distance and each provided with a disk pinion 7, 8, the periphery of which has cut upon it spiral gear teeth and the center of which is bored out and threaded to coöperate with said screw threaded ends. The yoke 4 is bored at its opposite ends to register with the pillar ends and to just slip over the screw threads thereof easily. At the top of the pillar ends above the yoke are nuts 9, 10. One side of the yoke carries lugs 11—11, which are bored out parallel to the yoke to carry a rotatable shaft 12 which has at its opposite ends two spiral gears 13—13 arranged to mesh with the disk pinions 7, 8 of the pillars. A knurled head 14 is fixed to one end of shaft 12. Nuts 9 and 10 being slacked and the mechanism having been assembled with gears 7 and 8 in the same plane and yoke 4 resting thereupon, it is clear that rotation of head 14 will operate to raise and lower said yoke and with it the capping heads 5 and 6. Nuts 9 and 10 being then tightly clamped, will prevent any further change in the height of the capping heads 5, 6 by means of adjusting head 14.

Supported at a suitable distance above the base 1 by the pillars 2, 3 is a main operating platform 15, the outline of which is best seen in Fig. 2; it is to and upon this platform that the bottles are fed when about to be capped and from it that they are removed when the capping operations are finished. Upon the base at one side of the pillars 2, 3 are provided bearings 16 for a main power shaft 17 provided at one side of its center with a beveled spur gear 18 arranged to coöperate with a similar spur gear 19 adapted to revolve upon a spindle 20 supported upon and between base 1 and shaft 17. Below gear 19 and integrally attached thereto, is a flat spur gear 21 adapted to mesh with a similar gear 22 of much larger diameter arranged to revolve in a recess below the surface of the base 1.

Gear 22 is fixed to a central shaft 23 supported between suitable bearings in the base 1 and platform 15 respectively. Fixed to the upper side of gear 22 is a face cam 24 covering about 180° and having a central high point with two sides symmetrically sloping to the surface of the gear; just above this cam is another face cam 25 of smaller diameter, the cam surface of which is complementary to that of cam 24. The upper end of shaft 23 carries, just below the platform 15, a spiral gear 26 adapted to mesh with a similar gear 27 fixed to a shaft 28 supported on the under side of the platform 15 parallel to the plane of the pillars and having at its ends two identical spiral gears in mesh with similar gears 29, 30 just at the edge of platform 15. Each of these gears 29, 30 is fixed to a spindle 31, 32 adapted to revolve in bearings supported by platform 15, and upon each spindle just above the platform is fixed an intermittent drive wheel 34 arranged to actuate periodically an adjacent star wheel 35 the function of which is to sweep the capped bottles one by one from the capping plunger after the capping operation has been completed. The intermittent drive wheel 34 comprises a thin flat disk 36 upon the upper face of which is fixed a relatively thin tubular segment 37 of which a part 38 comprising somewhat less than 90° of arc is broken away. At the edge of the disk and centrally opposite the broken away portion 38 is a pin 39.

The star wheels 35 are spaced above platform 15 by a washer and arranged to be revolved upon the upper smaller diametered portions 40 of pillars 2, 3 as axes. Each star wheel has four similar concave sides which conform closely to the outside of tubular segment 37 and cut perpendicularly to one another in the bottom face of each star wheel in its two longer axes are straight radial slots 41. As wheel 34 is rotated, each star wheel 35 is held rigidly in position through the greater part of each revolution by reason of the engagement of segment 37 with a concave side, but as pin 39 comes around it will enter one of the slots 41 and at the same instant the broken away part 38 will have advanced far enough over said concave side to permit the star wheel 35 to be rotated; after thus being turned through 90° a concave side will again be engaged by segment 37 and held until wheel 34 has made another revolution.

Besides gears 26 the shaft 23 also carries fixed upon it a plain spur gear 42 which actuates, through idler gears 43 and 44 supported by a bar 45 swung from platform 15, a gear 46 fixed to a spindle 47; to the top of said spindle, above the platform is fixed a feeding disk 48 comprising a bottom part 49 of large diameter recessed into the platform and an upper smaller diametered spool shaped part 50. By means of a second idler gear 51 gear 42 also drives a gear 52 which through a spindle 53 and intermediate mechanism actuates the sorting finger 54 by means of which successively fed bottles are sent now to one of the two capping heads and now to the other. This sorting finger 54 comprises a thin vertical slip fixed to one end of a flat bar 55 into the opposite end of which upon its lower side is cut a straight slot 56. Across the top of the bar are fixed short rectangular guide bars 57 arranged to slide in corresponding slots 57' cut on the lower side of a plate 58 supported above platform 15 by a ledge 59. Below plate 58 and fixed immediately upon platform 15 is a second similar plate 60 and it is between these two plates that the bar 55 is adapted to move to and fro. This it is enabled to do by reason of the disk 61 fixed to the top of spindle 53 and set in a suitable hole drilled in the lower plate 60; a pin 62 projecting from the upper surface of the disk engages slot 56.

The capping plungers 63 (Figs. 1, 8 and 9) are identical and constructed each as follows: a cylindrical riser 64 arranged for vertical movement in a bushing 64' fixed in platform 15 is held upon the top of a rod 65, and is counterbored below to have a sliding fit with a plug 66 which terminates said rod. Rod 65 is firmly screwed at its bottom into a driver 67 arranged for up and down movement in a bearing 68 fixed to pillars 2 and 3 the lower part of said driver and the bearing 68 being square in section to prevent rotation of the plunger. Fixed to the bottom of riser 64 is a thick cylindrical washer 64' centrally counterbored at its lower end to receive a relief spring 70 and concaved at its bottom periphery to seat a pair of rollers held at the ends of the longer arms of bell cranks 72 pivoted at 73 to a sleeve which is screw threaded to rod 65 and counterbored at its upper end to receive the other end of spring 70. The shorter arms 75 of bell cranks 72 rest upon the flat upper surface of a built up sliding stop 76 counterbored at its upper end to permit the suitably formed lower end of sleeve 74 to move therein and bored centrally at its lower end to slide upon rod 65. A capping spring 77 is interposed between the bottom of stop 76 and the driver 67. The normal compression of spring 77 may be made greater or less by adjusting the nut 77' down or up, rotation of the sliding stop being prevented by the screw 77² and slot 77³. Similarly any wear of the bottom concave of washer 64' may be compensated for by adjustment of the nut 77⁴. The bottom of driver 67 has a wide slot in which is set a roller 78 adapted to revolve upon a spindle prolonged beyond the driver and terminated by a cylindrical lug 79. The capping plungers are operated through the two face cams 24 and 25 the former of which engages the roller 78 to raise the plunger while the latter engages lug 79 and insures the return of the plunger.

Fixed by the portions 40 of pillars 2, 3 and supported upon platform 15 are two boxes 80 (dotted outlines Fig. 2) arranged to cover the drive wheel 34 and the greater part of star wheel 35.

A guide 81 is fixed to the top of platform 15 so as to overhang feeding disk 48 as shown the purpose of which will be explained later.

The operation of the invention is as follows: Bottles a, b, c, etc., are fed to feeding disk 48 in immediate proximity by means of the chute 82. In due course a bottle f will contact with guide 81 and be forced to position g by the pressure of the bottles behind it, which the feeding disk is bringing on. Finger 54 now moves to the right and carries the bottle from g to h upon the riser of the right hand capping plunger. This riser is immediately raised by reason of cam 24 actuating the right hand driver 67 and the bottle at h lifted into capping head 6 where the capping operation is performed. Cam 25 immediately lowers the driver by pressing upon its lug 79 after which the right hand star wheel 35 normally held free of the plunger sweeps the bottle from said plunger and out upon the platform to a position i from whence it may be removed. As soon as a bottle is moved from g to h as just described another bottle will be pushed into position g from the feeding disk and thence to h' upon the left hand riser the finger 54 this time moving to the left instead of to the right. Capping and removal of the capped bottle to position i' takes place as described for the right hand side.

Fig. 5 shows a sweeping finger 83 pivoted upon the top of the left hand box 80 and provided with a pin 84 arranged to engage a cam 84' fixed to the top of spindle 31. This finger actually does operate to push every bottle from position f to position g but is not essential as the pressure of the bottles behind is always sufficient to push the bottles from the feeding disk except in the case of the last bottle or two.

My machine is adapted to cap positively and certainly every bottle even should individual bottles run too long. In such case the riser 64 of the capping plunger is forced downwardly relatively to the driver thus forcing outwardly from one another the bell crank arms 71 and compressing both springs 70 and 77. By suitably determining the two springs as also by adjustment of the various threaded parts upon rod 65 the pressure required to thus shorten the capping plunger 63 may be varied within wide limits.

By using two springs 70 and 77 in the manner shown there is no compression of either until a certain maximum pressure, sufficient for effective capping, is attained. At this point the crank arms 71 are opened out against the pressure, as has just been stated, of both springs. During this opening the capping of the bottle is accomplished. Should the height of the bottle be such that any further shortening of the capping plunger 63 is entailed it will take place only against the upper spring 70 and at a pressure which has been determined small enough not to break the bottle.

It may be that an individual bottle is too great in diameter to fit upon the riser between its guard 84² and the sorting finger 54. In this case the spring 85 will be compressed by the head 86 to which the pin 62 (the latter broadly a part of disk 61) is attached and the finger 54 will be pressed inwardly toward the center of the disk against the resistance of the bottle which can, therefore, not be broken nor can the mechanism be injured.

My invention may be driven by a friction clutch 87 fixed to the power shaft 17; a fly wheel 88 may be used to steady the operation if desired.

Having described my invention, I claim:—

1. In a machine for feeding and capping bottles, in combination with capping mechanism, a reciprocating capping plunger said plunger comprising a rod, a riser, a capping spring abutting as to one end against said rod, a lever between the free end of said spring and the riser whereby the tension of said spring is multiplied, and a relief spring, substantially as and for the purpose described.

2. In a machine for feeding and capping bottles, in combination with capping mechanism, a reciprocating capping plunger said plunger comprising a rod, a riser, a capping spring abutting as to one end against said rod, a lever between the free end of said spring and the riser, means for disengaging the end of said lever from the riser, and a relief spring, substantially as and for the purpose described.

3. In a capping plunger the combination of a rod, a riser, a sliding stop, a capping spring between said sliding stop and said rod, and a multiplying lever pivotally supported upon said rod and engaged with both said stop and said riser, substantially as and for the purpose described.

4. In a capping plunger the combination of a rod, a riser, a sliding stop, a capping spring between said sliding stop and said rod and bell cranks pivotally supported upon said rod and provided with arms engaging said riser and said sliding stop, substantially as and for the purpose described.

In testimony whereof, I have hereunto set my hand in the presence of two subscribing witnesses.

HENRY GODFRIED KLETT.

Witnesses:
FRANK M. DOYLE,
JOHN A. S. KELLY.